United States Patent [19]

Madec et al.

[11] 4,446,902

[45] May 8, 1984

[54] TIRES FOR DRIVE WHEELS OF AGRICULTURAL TRACTORS OR SIMILAR VEHICLES

[75] Inventors: Francois Madec, Versailles; Emile Delobelle, Colombes; Georges Donvez, Neuilly sur Seine, all of France

[73] Assignee: Compagnie Generale des Etablissements Michelin, Clermont-Ferrand, France

[21] Appl. No.: 411,690

[22] Filed: Aug. 26, 1982

[30] Foreign Application Priority Data

Aug. 31, 1981 [FR] France ................. 81 16676

[51] Int. Cl.³ .............. B60C 11/08; B60C 13/00; B60C 9/20
[52] U.S. Cl. ................. 152/209 B; 152/352 R; 152/353 R; 152/354 R; 152/361 R; D12/149; D12/152
[58] Field of Search .......... 152/209 R, 209 A, 209 B, 152/209 NT, 209 WT, 209 D, 352 R, 353 R, 353 C, 353 G, 354 R, 354 RB, 355, 356 R, 361 R, 361 FP, 361 DM; D12/136, 140, 146, 147, 148–151, 152

[56] References Cited

U.S. PATENT DOCUMENTS

| D265,307 | 7/1982 | Maeda et al. | D12/149 |
| 3,603,370 | 9/1971 | Hylbert et al. | 152/209 B |
| 4,383,567 | 5/1983 | Crum et al. | 152/209 B |

FOREIGN PATENT DOCUMENTS 1237762 6/1960 France ................. 152/209 B

Primary Examiner—Lois E. Boland
Attorney, Agent, or Firm—Brumbaugh, Graves, Donohue & Raymond

[57] ABSTRACT

A radial tire for drive wheels of agricultural tractors has two staggered rows of raised lugs each occupying one half of the tread. Each lug consists of an axially outward segment forming an angle of from 85° to 100° with the circumferential direction of the tire and an axially inward segment connected to the axially outward segment by an intermediate segment and forming an angle less than 30° with the circumferential direction of the tire and about equal to the angles of the tread reinforcement plies, the latter being arranged between the tread and the radial carcass reinforcement. The quasi-cylindrical tread reinforcement has an axial width at most equal to 0.9 times the axial width of the tire and the radial carcass reinforcement reaches its maximum meridian curvature in the region of the shoulders.

17 Claims, 5 Drawing Figures

TIRES FOR DRIVE WHEELS OF AGRICULTURAL TRACTORS OR SIMILAR VEHICLES

The present invention relates to tires intended for drive wheels of agricultural tractors or similar vehicles used mainly on loose ground.

The invention concerns in particular the treads of tires of the above type. These treads consist basically of large lugs spaced from one another and arranged in two rows, each of which extend axially over approximately a different half of the width of the tread. The lugs are alternately staggered in the circumferential direction of the tire from one row to the other. Each of these lugs consists of two basically rectilinear segments joined to one another and forming different angles with the circumferential direction of the tire.

Such lugs are known, for example, from U.S. Pat. No. 3,603,370. In that patent, the axially inward segment of the lugs formed an angle of from 15° to 35° with the circumferential direction of the tire and the axially outward segment of the lugs forms an angle of from 60° to 75° with the circumferential direction of the tire. However, such a tread has inadequate grip in loose ground as well as insufficient resistance to wear, particularly on hard ground (roads, etc.), which appears to be due to the overall arrangement of the lugs as well as to deformations of the body of the tire (bias ply type carcass reinforcement).

The same holds true for the arrangement according to French Pat. No. 1,237,762, in accordance with which rectilinear lugs are alternately arranged in a V and each extended to the outside of the tire by a transverse segment resting on the sidewall.

Of more recent use are treads with rectilinear or slightly curvilinear lugs alternately arranged in a V on tires of the type having a radial carcass covered with a tread reinforcement (belt). In that case there is furthermore insufficient resistance to wear on loose ground, particularly when such tires are used on the front axle of tractors equipped with two drive axles. In that case, it is imperative that the tires mounted on the front (drive) axle have an adherence on loose ground that is greater than that of the tires on the rear (drive) axle.

Thus, the object of the invention is to improve the performance and endurance of radial tires of the above type, particularly when they are used on tractors having two drive axles.

For this purpose, the invention provides tires for drive wheels of agricultural tractors or similar vehicles having a tread with raised members which consist of large lugs spaced from one another and arranged in two rows each of which extends axially over approximately a different half of the tread, the lugs being alternately staggered in the circumferential direction of the tire and each consisting of two essentially rectilinear segments joined to one another and forming different angles with the circumferential direction of the tire, characterized by the fact that the tire comprises a radial carcass reinforcement whose meridian curvature, with the tire mounted on its rim and inflated normally but not flattened by a load, is at its maximum in the region of the shoulders of the tire and a tread reinforcement having an axial width at most equal to 0.9 times and preferably from 0.75 to 0.85 times the axial width of the tire arranged radially outward around the radial carcass reinforcement and consisting of at least two plies having parallel cables in each ply which cross from one ply to the next forming about equal angles at the equator of less than 30° and preferably from 15° to 20° with the circumferential direction of the tire, and the axially outward segment of the lugs projects axially from the corresponding edge of the tread reinforcement and forms an angle of from 85° to 100° with the circumferential direction of the tire and the axially inward segment of the lugs forms an angle of less than 30° with the circumferential direction of the tire about equal to the angles of the radially outward plies of the tread reinforcement, the axially inward segment, which is intended to touch the ground in the contact area of the tire before the axially outward segment, being connected to the axially outward segment by means of an intermediate segment, preferably bent, extending axially over a width equal to approximately 0.15 times the axial width of the tire.

In preferred embodiments of the invention:

the tread reinforcement has a meridian curvature approximately constant from one edge to the other which is at most equal to and preferably less than the circumferential curvature (inverse of half of the overall diameter) of the tire;

the radial carcass reinforcement is parallel to the tread reinforcement along a zone centered over the equator and having an axial width at least equal to 0.75 times the axial width of the tread reinforcement;

the tread reinforcement is formed of plies having parallel cables in each ply which cross from one ply to the next forming about equal angles at the equator, preferably symmetrical, of about 20° with the circumferential direction of the tire;

the tread reinforcement is formed, in addition to the plies of cables arranged at angles of less than 30°, of at least one ply of parallel cables located radially inward of the preceding ones and forming an angle greater than 45° with the circumferential direction of the tire;

the lugs have a practically constant width, measured at the level of the radially outward surface of the lugs which is intended to make contact with the ground;

two consecutive lugs of the same row are spaced in the circumferential direction at a distance at least equal to 4 times the width of the lug;

the axially outward segment of the lugs projects axially from the corresponding edge of the tread reinforcement for a distance of from 0.1 to 0.2 times the axial width of the tire, the end of said projection being capable of constituting a protective protuberance for the corresponding shoulder of the tire;

the two rows of lugs axially overlap one another on both sides and along the equator over a width at most equal to the width of the lugs measured at their axially inward end;

the two rows of lugs are axially distant from one another on both sides and along the equator over a width at most equal to the width of the lugs measured at their axially inward end;

the meridian curvature of the surface of the lugs which is intended to make contact with the ground is less than that of the tread reinforcement;

the aspect ratio of the radial height of the tire on its rim to the width of the body of the tire is from 0.6 to 0.9.

Exemplary embodiments of the invention are shown in the drawing described below, in which.

Figure 1:
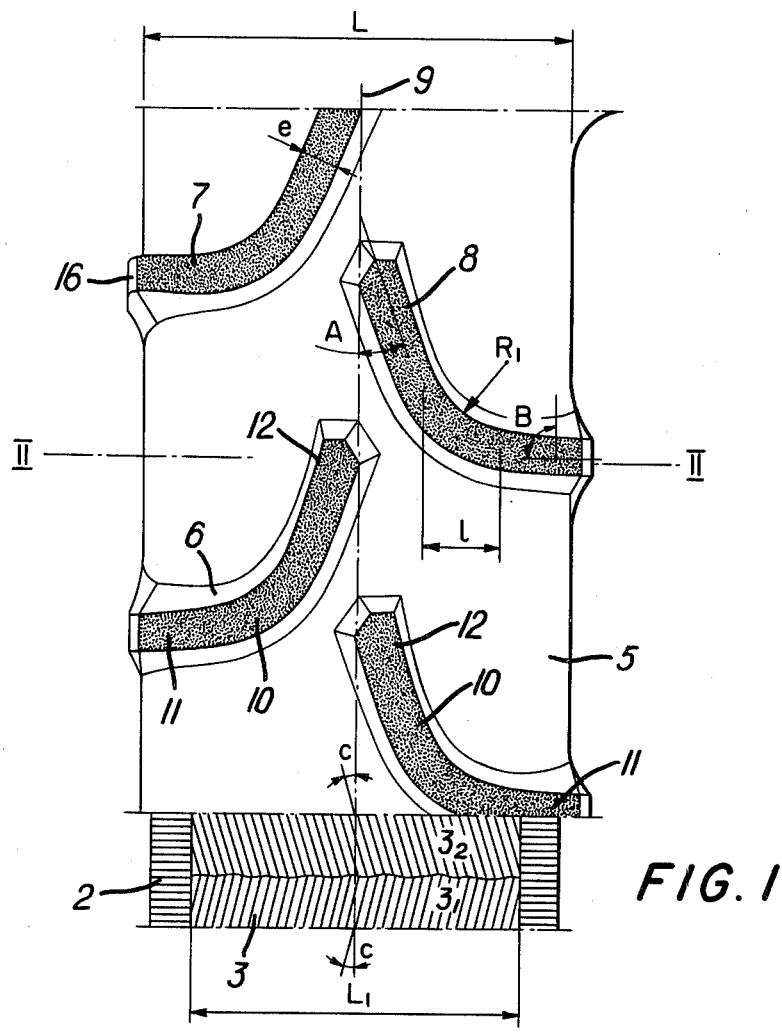
FIG. 1 is a top view of a part of a tire in accordance with the invention showing a portion of the reinforcement (carcass and tread) exposed.

On the tread part of FIG. 1 there can be noted large lugs 6 which are spaced at a distance from one another and arranged in two rows. Each row extends axially over approximately a different half of the tread. From one row to the next, the lugs 6 are alternately staggered in the circumferential direction of the tire. The lugs 6 of one row are similar to those of the other row. The lugs 6 each consist of two segments 11, 12, essentially rectilinear or very slightly curved, which are joined to one another and form different angles A and B with the circumferential direction of the tire.

Figure 2:
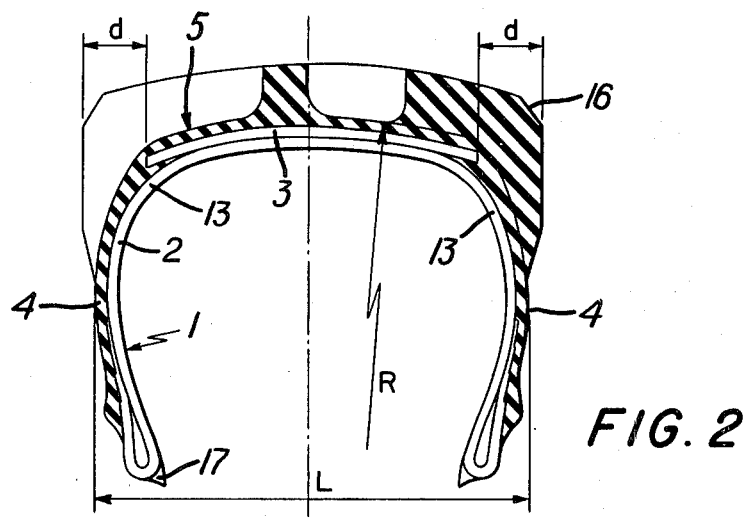
FIG. 2 is a radial or transverse cross section of the tire of FIG. 1 along the line II—II.

The tire 1 of FIG. 2 consists of a radial carcass reinforcement 2 and a tread reinforcement 3. The radial carcass reinforcement 2, when the tire 1 is mounted on its rim and inflated normally but not flattened by a load, reaches its maximum meridian curvature at the two shoulders 13.

The tread reinforcement 3 is arranged radially outward around the radial carcass reinforcement 2 and its axial width $L_1$ is at most equal to 0.9 times and preferably from 0.75 to 0.85 times the maximum axial width L of the tire body 1 between the beads 17 and the protective protuberances 16 of the shoulders 13. In the object of one preferred embodiment, these protuberances 16 are expressly excluded from the measurement of said width L. The tread reinforcement 3 consists of at least two plies $3_1$, $3_2$ having parallel cables in each ply, with the one ply $3_1$ crossed over the other ply $3_2$ and forming about equal angles C at the equator 9 of less than 30° and preferably from 15° to 20° with the circumferential direction of the tire.

In accordance with the invention, the axially outward segment 11 of the lugs 6 projects axially from the corresponding edge of the tread reinforcement 3 and forms an angle B of from 85° to 100° with the circumferential direction of the tire. The axially inward segment 12 of the lugs 6, which is intended to touch the ground in the contact area 14 (FIG. 5) of the front tire before the axially outward segment 11, is connected to said segment 11 by means of an intermediate segment 10, preferably a bend on an arc having the radius $R_1$. This connecting segment 10 extends, in accordance with the invention, over an axial width l equal to approximately 0.15 times the axial width L of the tire 1, as defined above. The axially inward segment 12 of the lugs 6 of the invention forms an angle A with the circumferential direction of the tire less than 30° and about equal to the angles C of the radially outward plies $3_1$, $3_2$ of the tread reinforcement 3.

The tread reinforcement 3 has a meridian curvature 1/R which is very low and approximately constant from one edge to the other. This meridian curvature is at most equal to and preferably less than the circumferential curvature, which is equal to the inverse of half of the overall diameter of the tire. The radial carcass reinforcement 2 is parallel to the tread reinforcement 3 along a zone centered over the equator 9 and having an axial width at least equal to 0.75 times the axial width $L_1$ of the tread reinforcement 3. Preferably, plies $3_1$, $3_2$ of the tread reinforcement 3 are arranged symmetrically and form about equal angles C at the equator 9 of 20° with the circumferential direction of the tire.

The tread reinforcement 3 of the invention is formed of at least two plies $3_1$, $3_2$ of cables inclined at less than 30° to the circumferential direction of the tire. In accordance with the invention, plies $3_1$, $3_2$ are arranged under the tread, the same as in the case where, in one preferred embodiment, tread reinforcement 3 additionally includes at least one radially inward ply (not shown) of parallel cables forming an angle greater than 45° with the circumferential direction of the tire. The axially inward segments 12 of lugs 6 of the invention are noticeably oriented parallel to the plies $3_1$, $3_2$ which are inclined less than 30°, that is, parallel to the direction along which the tread reinforcement (belt) 3 acts. Thus, it appears that the quasi-longitudinal axially inward segments 12 of lugs 6 are optimally supported by the underlying belt 3 and offer good resistance to wear on both hard and loose ground. These quasi-longitudinal axially inward segments 12 just as easily penetrate into loose ground. Consequently, lateral shifting of the earth and tracking, particularly on sloping ground, are improved. Furthermore, these plies $3_1$, $3_2$ which are inclined less than 30° impart to the tire of the invention a quasi-cylindrical tread which contracts very little in the area of contact 14 with the ground.

Figure 5:
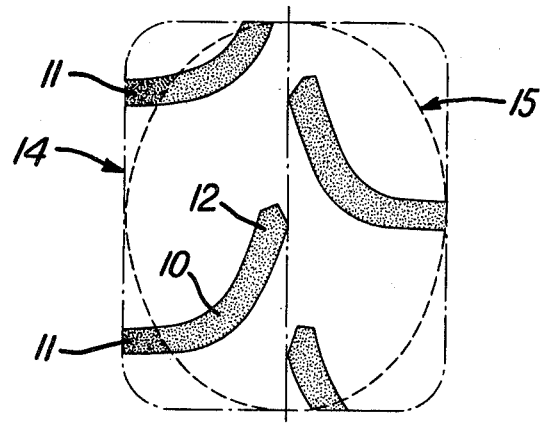
FIG. 5 illustrates the functioning of the invention.

On the other hand, the quasi-transverse axially outward segments 11 project from the corresponding edge of the tread reinforcement 3 for a distance d of from 0.1 to 0.2 times the axial width L of the tire 1, as defined above. The end of this projection may constitute a protuberance 16 exceeding the axial width L of the tire 1 which is intended to protect the corresponding shoulder 13. Thus, the terminal portions of the quasi-transverse axially outward segments 11 of lugs 6 are supported by the radial carcass reinforcement 2, particularly where the radial carcass reinforcement 2 reaches its maximum curvature. Considering the quasi-rectangular shape of the ground contact area 14 (FIG. 5) due to reinforcement of the tread in accordance with the invention, the quasi-transverse axially outward segments 11 of lugs 6 attack the loose ground over their full axial length and not only on their intermediate segment of connection 10 to the quasi-longitudinal axially inward segment 12 as in the case of a tire having a bias ply carcass with an elliptical ground contact area 15 as is shown in FIG. 5 by way of comparison. Furthermore, the underlying quasi-longitudinal plies $3_1$, $3_2$ contribute to longitudinal immobilization of the concave connecting segment 10 of the lugs 6.

The lugs 6 of the invention preferably have a practically constant width e, measured at the level of the radially outward surface of the lugs which is intended to contact the ground. The spacing 5 in the circumferential direction between two consecutive lugs 6 of the same row is at least equal to 4 times the width e of a lug 6.

Figure 3:
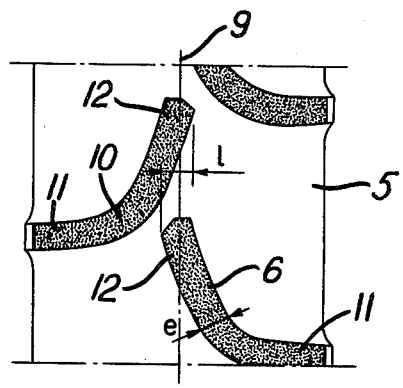
FIGS. 3 and 4 illustrate other embodiments of the invention.
Figure 4:
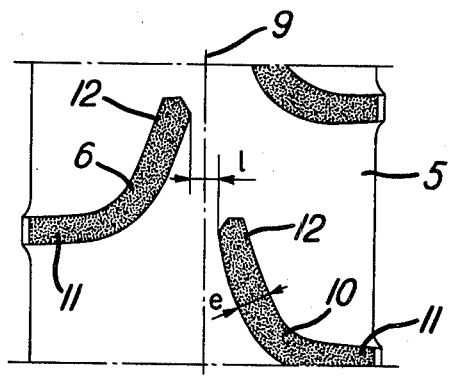

If it is desired to increase the longitudinal adherence and the resistance to wear or the self-cleaning capability of the tread of the invention, it is advantageous to offset axially, outwardly (FIG. 4) or inwardly (FIG. 3), the axially inward ends 12 of the lugs 6, whereas in FIG. 1 these ends 12 are aligned along the equatorial plane 9. However, the axial width of spacing l (FIG. 4) or overlap l (FIG. 3) advantageously should not exceed the width e of lugs 6 measured over the axially inward segment 12, lugs 6 remaining in any case separated one from another.

As shown in FIG. 2, the meridian curvature of the surface of lugs 6 which is intended to make contact with the ground is less than that of the tread reinforcement 3. In other words, the maximum radial height of the lugs 6 above the bottom of the tread increases from the equator 9 to the edges of the tread, the latter being determined by the axially outward ends 11 of the lugs 6.

The aspect ratio of the radial height of the tire on its rim to the width of the body of the tire is from 0.6 to 0.9.

What is claimed is:

1. A tire for drive wheels of agricultural tractors or similar vehicles having a tread with raised members which consist of large lugs spaced from one another and arranged in two rows each of which extends axially over approximately a different half of the tread, the lugs being alternately staggered in the circumferential direction of the tire and each consisting of two essentially rectilinear segments joined to one another and forming different angles with the circumferential direction of the tire, characterized by the fact that the tire comprises a radial carcass reinforcement whose meridian curvature, with the tire mounted on its rim and inflated normally but not flattened by a load, is at its maximum in the region of the shoulders of the tire and a tread reinforcement having an axial width at most equal to 0.9 times the axial width of the tire arranged radially outward around the radial carcass reinforcement and consisting of at least two plies having parallel cables in each ply which cross from one ply to the next forming about equal angles at the equator of less than 30° with the circumferential direction of the tire, and the axially outward segment of the lugs projects axially from the corresponding edge of the tread reinforcement and forms an angle of from 85° to 100° with the circumferential direction of the tire and the axially inward segment of the lugs forms an angle less than 30° with the circumferential direction of the tire about equal to the angles of the radially outward plies of the tread reinforcement, the axially inward segment, which is intended to touch the ground in the contact area of the tire before the axially outward segment, being connected to the axially outward segment by means of an intermediate segment, extending axially over a width equal to approximately 0.15 times the axial width of the tire.

2. A tire according to claim 1, characterized by the fact that the tread reinforcement has a meridian curvature approximately constant from one edge to the other which is at most equal to the circumferential curvature (inverse of half of the overall diameter) of the tire.

3. A tire according to claim 1 or 2, characterized by the fact that the radial carcass reinforcement is parallel to the tread reinforcement along a zone centered over the equator and having an axial width at least equal to 0.75 times the axial width of the tread reinforcement.

4. A tire according to claim 1 or 2, characterized by the fact that the tread reinforcement is formed of plies having parallel cables in each ply which cross from one ply to the next forming about equal angles at the equator of about 20° with the circumferential direction of the tire.

5. A tire according to claim 1 or 2, characterized by the fact that the tread reinforcement is formed, in addition to the plies of cables arranged at angles of less than 30°, of at least one ply of parallel cables located radially inward of the preceding ones and forming an angle greater than 45° with the circumferential direction of the tire.

6. A tire according to claim 1 or 2, characterized by the fact that the lugs have a practically constant width, measured at the level of the radially outward surface of the lugs which is intended to make contact with the ground.

7. A tire according to claim 1 or 2, characterized by the fact that two consecutive lugs of the same row are spaced in the circumferential direction at a distance at least equal to 4 times the width of a lug.

8. A tire according to claim 1 or 2, characterized by the fact that the axially outward segment of the lugs projects axially from the corresponding edge of the tread reinforcement for a distance of from 0.1 to 0.2 times the axial width of the tire, the end of said projecting being capable of constituting a protective protuberance for the corresponding shoulder of the tire.

9. A tire according to claim 1 or 2, characterized by the fact that the two rows of lugs axially overlap one another on both sides and along the equator over a width at most equal to the width of the lugs measured at their axially inward end.

10. A tire according to claim 1 or 2, characterized by the fact that the two rows of lugs are axially distant from one another on both sides and along the equator over a width at most equal to the width of the lugs measured at their axially inward end.

11. A tire according to claim 1 or 2, characterized by the fact that the meridian curvature of the surface of the lugs which is intended to make contact with the ground is less than that of the tread reinforcement.

12. A tire according to claim 1 or 2, characterized by the fact that the aspect ratio of the radial height of the tire on its rim to the width of the body of the tire is from 0.6 to 0.9.

13. A tire according to claim 1, characterized by the fact that the tread reinforcement has an axial width of from 0.75 to 0.85 times the axial width of the tire.

14. A tire according to claim 1, characterized by the fact that the parallel cables in each ply of the tread reinforcement cross from one ply to the next forming equal angles at the equator of from 15° to 20° with the circumferential direction of the tire.

15. A tire according to claim 1, characterized by the fact that the intermediate segment of the lugs is bent.

16. A tire according to claim 2, characterized by the fact that the meridian curvature of the tread reinforcement is less than the circumferential curvature (inverse of half of the overall diameter) of the tire.

17. A tire according to claim 4, characterized by the fact that the parallel cables in each ply of the tread reinforcement cross from one ply to the next forming equal symmetrical angles at the equator of 20° with the circumferential direction of the tire.

* * * * *

UNITED STATES PATENT AND TRADEMARK OFFICE
CERTIFICATE OF CORRECTION

PATENT NO. : 4,446,902

DATED : May 8, 1984

INVENTOR(S) : Francis Madec et al

It is certified that error appears in the above—identified patent and that said Letters Patent is hereby corrected as shown below:

First page, Item [73], "Compagnie Generale ... Michelin, Clermont-Ferrand, France" should read -- Pneumatiques Caoutchouc Manufacture et Plastiques KLEBER-COLOMBES, S.A., Colombes, France --. Col. 6, lines 21 and 22, "projecting" should read -- projection --.

Signed and Sealed this

Eleventh Day of December 1984

[SEAL]

Attest:

Attesting Officer

GERALD J. MOSSINGHOFF

Commissioner of Patents and Trademarks